United States Patent [19]

Dupraz et al.

[11] Patent Number: 5,444,599
[45] Date of Patent: Aug. 22, 1995

[54] CAPACITOR HAVING HIGH STABILITY WITH TEMPERATURE

[75] Inventors: Jean-Pierre Dupraz; Jean-Paul Gris, both of Lyons; Daniel Trenchat, Tignieu Jameyzieu, all of France

[73] Assignee: GEC Alsthom T & D SA, Paris, France

[21] Appl. No.: 241,809

[22] Filed: May 12, 1994

[30] Foreign Application Priority Data

May 13, 1993 [FR] France ................................ 93 05766

[51] Int. Cl.$^6$ .............................................. H01G 4/02
[52] U.S. Cl. ..................... 361/274.1; 361/303; 361/326; 174/17 GF; 324/126; 324/685
[58] Field of Search .......................... 174/17 GF, 52.3; 323/359, 370; 324/105, 126, 670, 685; 361/272, 274.1, 275.1, 281, 282, 279, 303, 306.1, 326, 328, 329, 330, 604

[56] References Cited

U.S. PATENT DOCUMENTS

| | | | |
|---|---|---|---|
| 2,207,783 | 7/1940 | Carlson et al. | 361/274.1 |
| 2,448,887 | 9/1948 | Huckleberry | 361/274.1 |
| 3,646,412 | 2/1972 | Boersma et al. | |
| 3,988,684 | 10/1976 | Müller et al. | 361/326 |
| 4,052,668 | 10/1977 | Schmitt et al. | 324/126 |
| 5,053,915 | 10/1991 | Dupraz | 361/281 |
| 5,068,598 | 11/1991 | Moncorge . | |

FOREIGN PATENT DOCUMENTS 2651889  3/1991  France .

OTHER PUBLICATIONS

French Search Report FR 9305766.

*Primary Examiner*—Bruce A. Reynolds
*Assistant Examiner*—Gregory L. Mills
*Attorney, Agent, or Firm*—Sughrue, Mion, Zinn, Macpeak & Seas

[57] ABSTRACT

A capacitor having high stability with temperature comprising a cylindrical metal body, a cylindrical high tension electrode coaxial with the body and placed inside it, and at least two low tension electrodes constrained to remain in contact against the inside wall of the body via an intervening insulating layer, said electrodes being disposed symmetrically about the geometrical axis of the body, said low tension electrodes being held in place by retaining means that allow them to expand freely, the dielectric medium extending between the high tension electrode and the low tension electrodes being a gas or a vacuum, the expansion coefficient $\alpha c$ of the body being equal to the expansion coefficient $\alpha h$ of the high tension electrode, and the expansion coefficient $\alpha c$ of the body material being related to the expansion coefficient $\alpha b$ of the material of the low tension electrodes by the following inequalities:

$$1.5 < \alpha b / \alpha c < 2.5$$

14 Claims, 9 Drawing Sheets

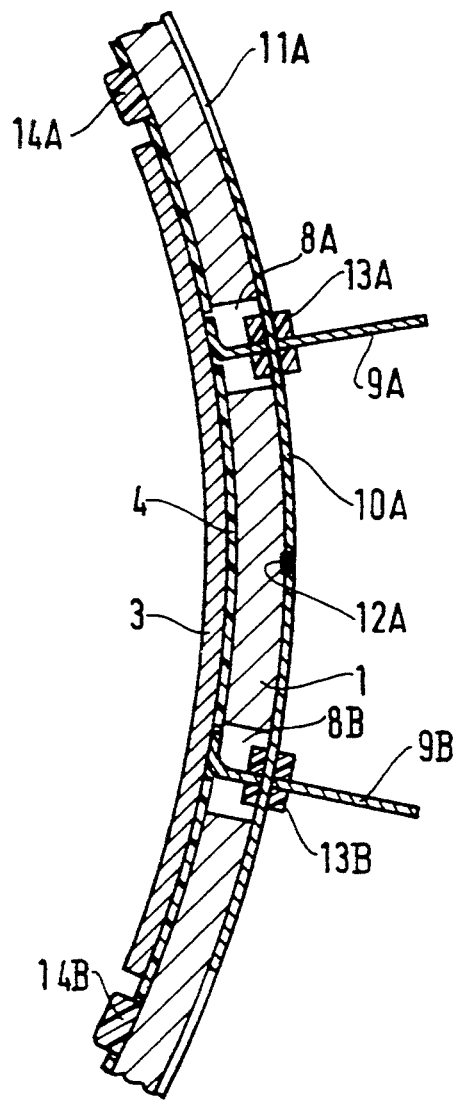
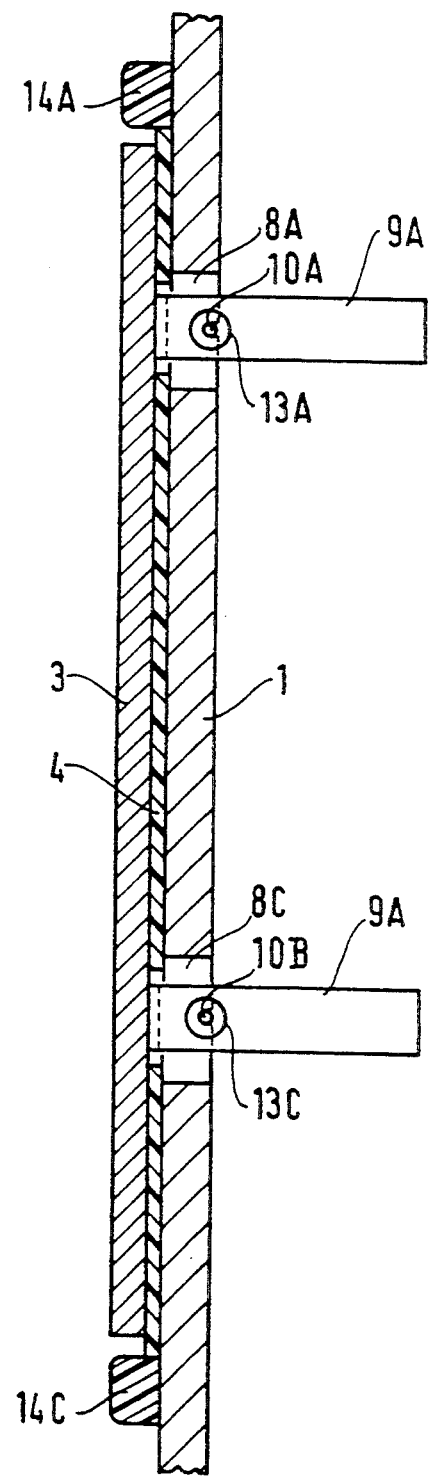
FIG.4
FIG.5

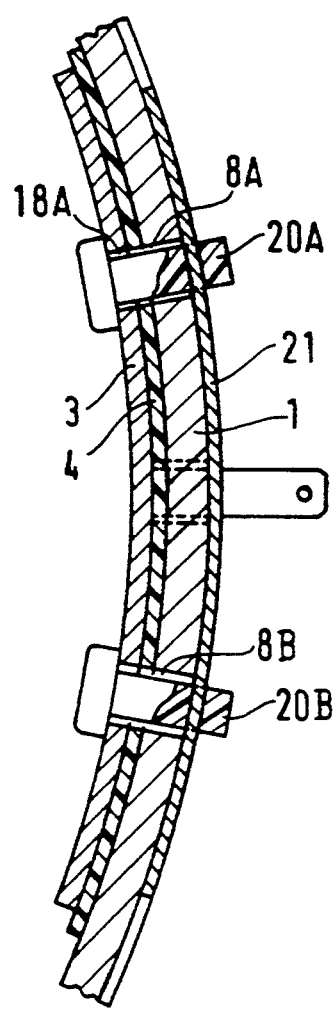
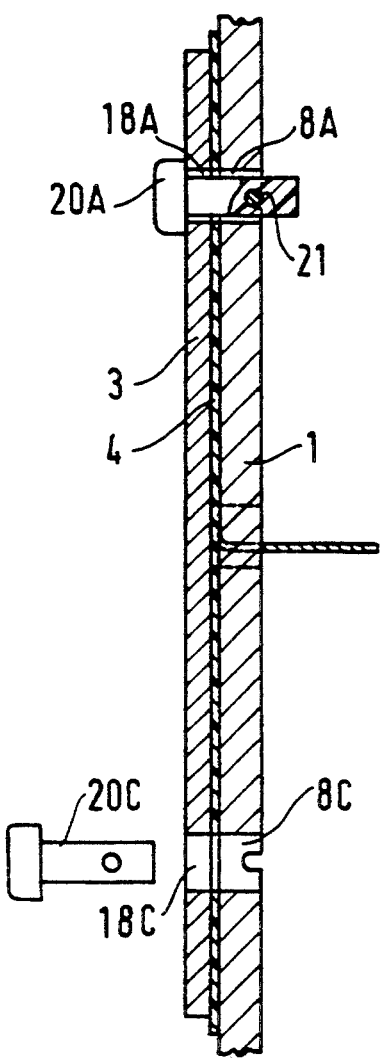

CAPACITOR HAVING HIGH STABILITY WITH TEMPERATURE

The present invention relates to a capacitor designed in particular for fitting to a device for accurately measuring an electrical tension inside an electrical apparatus having grounded metal cladding and insulated by means of sulfur hexafluoride $SF_6$.

BACKGROUND OF THE INVENTION

One such tension measuring device is described in French patent application No. 89 16 189 filed on Dec. 7, 1989 in the name of GEC ALSTHOM SA.

FIG. 1 accompanying the present specification shows the electrical circuit used to obtain an image of the tension that is to be measured.

The line L1 designates a high tension conductor whose tension Up is to be measured.

The circuit comprises a first capacitor C1 referred to as the high tension capacitor that is connected via a link cable L2 to the negative input of an operational amplifier A which is provided with a second capacitor C2 connected between its output and its negative input. The positive terminal of the operational amplifier is connected to ground. The capacitor $\gamma$ represents stray capacitance taken as a whole and including, in particular, the capacitance of the link cable L2 and the capacitance formed by the low tension capacitor plate and ground. The capacitance of the cable L2 is not negligible since the operational amplifier A is situated in a measurement room B that may be several tens of meters distant from the location in which the high tension capacitor C1 is placed.

The output voltage Us of the operational amplifier is an image of the voltage to be measured since these two magnitudes are related by the equation:

$$Up = -Us \cdot C2/C1$$

In order to ensure that the image Us is independent of temperature, it is necessary for the ratio C2/C1 to be independent of temperature.

The capacitor C2 is located in the measurement room and it is easy to place it in a temperature-regulated enclosure.

However the capacitor C1 is located in the apparatus or in the vicinity thereof, and it often happens that the apparatus is out-of-doors where temperature may vary over a very wide range, e.g. $-50°$ C. to $+60°$ C.

Measurement accuracy therefore depends on the variation in the capacitance of the capacitor C2 with temperature. To obtain an accurate measurement of the tension Us regardless of the temperature to which the capacitor C1 is subjected, it is necessary for the capacitance of said capacitors to be independent of temperature.

OBJECTS AND SUMMARY OF THE INVENTION

A first object of the invention is to provide a capacitor whose capacitance is independent of temperature.

Another object of the invention is to provide a capacitor that is easy to manufacture and that is cheap.

Another object of the invention is to provide a capacitor such that its stray capacitance relative to the ground is very slightly inductive so as to offer a preferred path for the flow of very high frequency signals present on the low tension electrode.

The present invention provides a capacitor having high stability with temperature, comprising a cylindrical metal body, a cylindrical high tension electrode coaxial with the body and placed inside it, and at least two low tension (LT) electrodes constrained to remain in contact against the inside wall of the body via an intervening insulating layer, said electrodes being disposed symmetrically about the geometrical axis of the body, said low tension electrodes being held in place by retaining means that allow them to expand freely, the dielectric medium extending between the high tension electrode and the low tension electrodes being a gas or a vacuum, the expansion coefficient ac of the body being equal to the expansion coefficient $ah$ of the high tension electrode, and the expansion coefficient $ac$ of the body material being related to the expansion coefficient $ab$ of the material of the low tension electrodes by the following inequalities:

$$1.5 < ab/ac < 2.5$$

BRIEF DESCRIPTION OF THE DRAWINGS

The invention is now explained in greater depth by the following description of an embodiment given with reference to the accompanying drawings, in which:

FIG. 4 is a fragmentary cross-section view of a portion of the capacitor, showing a first embodiment of the first method of fixing the LT electrodes;

FIG. 5 is a fragmentary axial section view of a portion of the capacitor, showing the same method of fixing the LT electrodes as that shown in FIG. 4;

FIG. 8 is a fragmentary cross-section view of a portion of a capacitor showing a third method of fixing the LT electrodes;

FIG. 9 is a fragmentary axial section view of a portion of the capacitor, showing the same method of fixing the LT electrodes as that shown in FIG. 8;

MORE DETAILED DESCRIPTION

Figure 2:
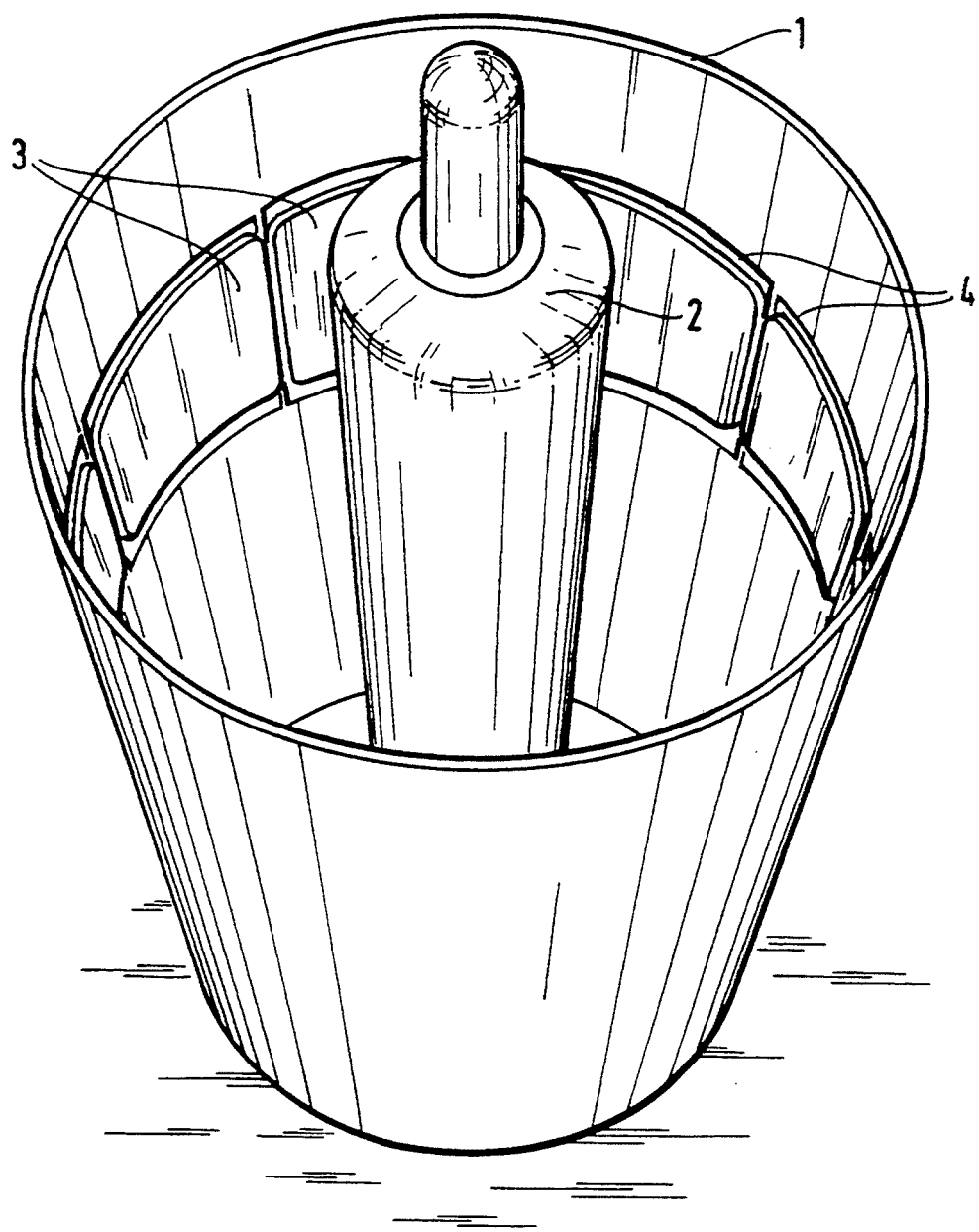
FIG. 2 is a perspective view of a capacitive sensor made in accordance with the invention.

The capacitor shown in FIG. 2 comprises an outer cylindrical body 1 (referred to more simply below merely as the "body"). The body is made of a material having a coefficient of linear expansion $ac$ that is known accurately. The material is preferably a metal, but it could equally be a metal-plated insulating material such as a plastics material or a composite. If the material is a metal, then an aluminum alloy may be selected, for example.

The body 1 serves to support low tension electrodes as described below.

The capacitor also comprises an inner electrode 2 designed to be connected to the high tension HT. That is why the electrode 2 is referred to below as the "HT electrode". This electrode is a cylinder made of a material whose coefficient of linear expansion $\alpha h$ is known accurately. Like the body, the material of the HT electrode is either a metal or a metal-plated insulator. The material of the HT electrode is preferably selected to be identical to that of the body.

The body and the HT electrode are disposed coaxially and they are held fixed one relative to the other by means that are described below.

The body serves to support a certain number of electrodes 3 that are referred to below as LT electrodes since they are connected to the low tension (LT) side. The LT electrodes are preferably made of sheets of metal or metal alloy having a linear coefficient of expansion $\alpha b$ that is known accurately. This material may advantageously be selected amongst the stainless steels.

Each LT electrode is separated from the body by a sheet 4 of insulating material having a linear coefficient of expansion $\alpha f$. The insulating material is preferably selected from silicone films, polypropylenes, the materials known under the registered trademarks Mylar and Teflon, and in particular such materials that withstand the decomposition products of sulfur hexafluoride.

The assembly is located either in a vacuum, or else in a dielectric medium that allows all of its component parts to expand freely. Usually, the sensor is placed in the sulfur hexafluoride $SF_6$ that obtains inside a grounded metal-clad type of station or apparatus (i.e. contained within a metal enclosure).

Figure 3:
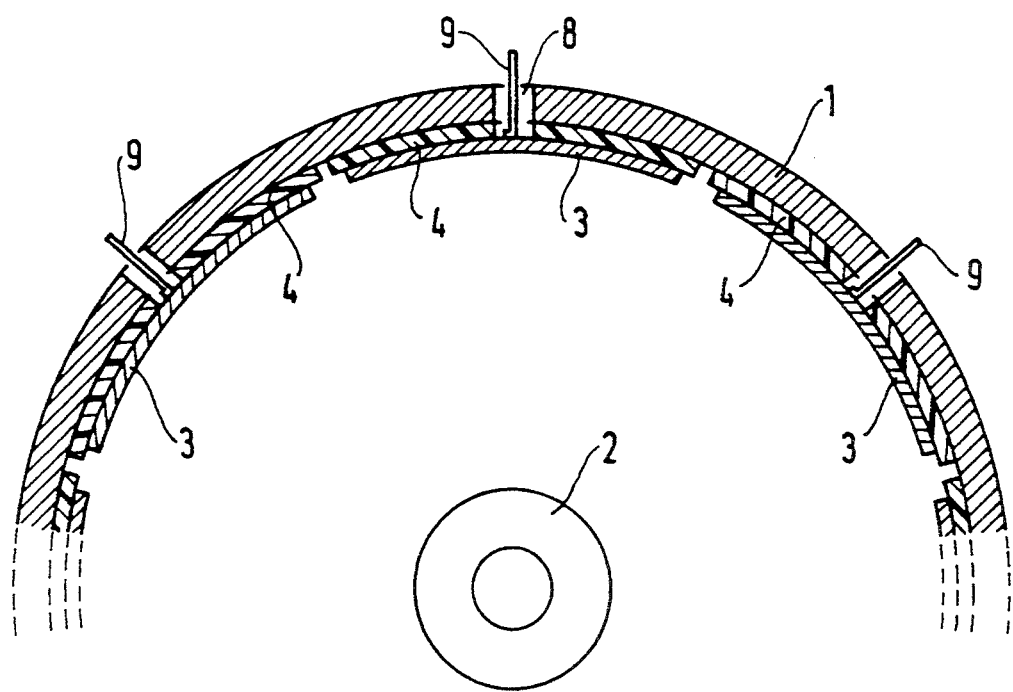
FIG. 3 is a fragmentary cross-section view of the FIG. 1 sensor.

As shown in FIG. 3, the LT electrodes are preferably rectangular or square, having rounded corners, and pressed against the inside surface of the body by mechanical means that enable them to expand freely under the effect of changing temperature. Several variant embodiments of these devices are described below.

The body is provided with holes 8 to allow metal connection tabs 9 to be bonded to the LT electrodes.

Figure 1:
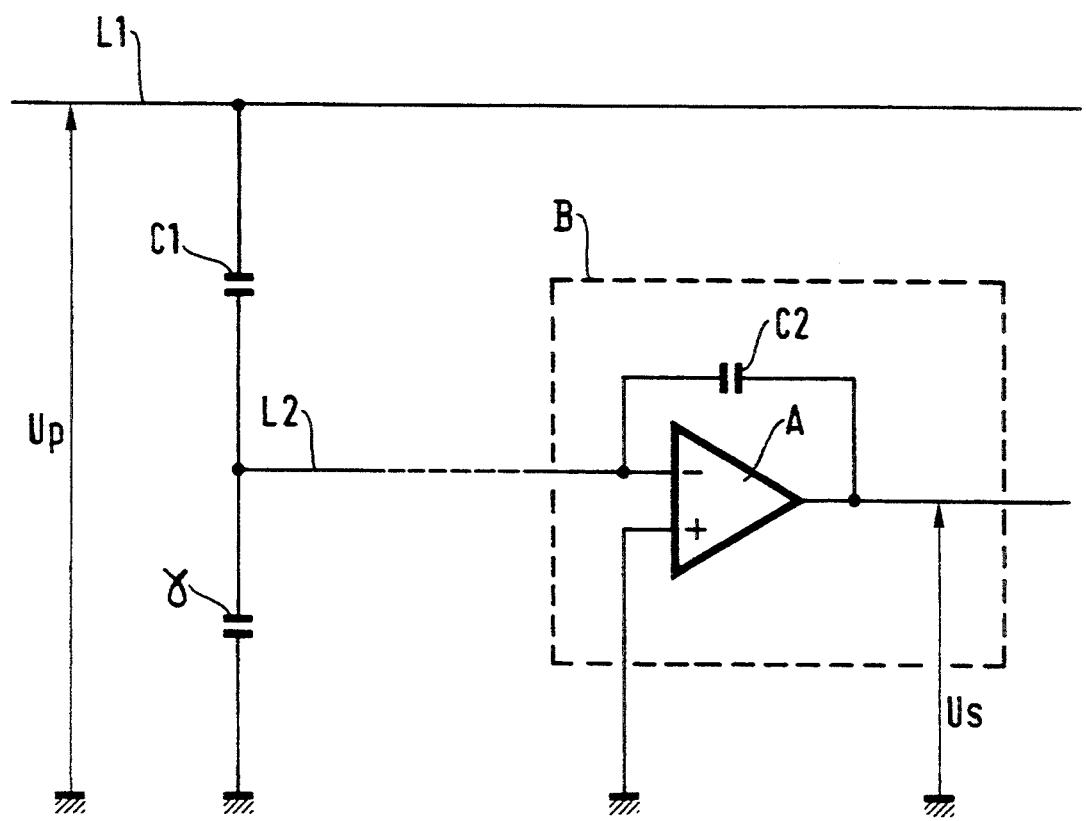
FIG. 1 is a circuit diagram of a tension measuring device.

In association with each LT electrode, the HT electrode defines a capacitor portion whose dielectric is constituted by the above-defined medium. The various capacitor portions are connected together electrically so as to make up the capacitor C1 referenced in FIG. 1 and used in implementing the tension-measuring device.

The number of LT electrodes and the dispositions thereof within the body are selected to enable them to be grouped together by forming a symmetrical connection pattern. It is thus possible to constitute the following groups:

two LT electrodes that are at 180° from each other;
three LT electrodes that are at 120° from one another;
four LT electrodes spaced in pairs at 90° intervals; etc.

In addition, the electrodes may be grouped together so as to provide capacitors that are independent. A preferred embodiment comprises eight identical LT electrodes that are symmetrically distributed around the body at angular intervals of 45°. The electrodes are grouped together in fours, with each group co-operating with the HT electrode to form a capacitor C1, thereby making it possible to provide a measurement circuit that is redundant. The two capacitors C1 formed in this way are interleaved, each having LT electrodes that are distributed at 90° angular intervals.

It is shown below that an appropriate choice of materials makes it possible to obtain a capacitance C1 whose variation with temperature is close to zero.

To a first approximation, the capacitance is given the following relationship:

$$C1 = 2\pi \cdot Eo \cdot Er \cdot N \cdot (S/DE)/Ln(De/d)$$

in which:

Ln designates natural logarithm $$De = D - 2(hf + he)$$

where:
Eo: vacuum permittivity
Er: permittivity of the dielectric in C1
N: number of LT electrodes connected in parallel
S: surface area of one electrode
D: inside diameter of the body
d: diameter of the HT electrode
he: thickness of an LT electrode
hf: thickness of the insulating film.

Under the effect of temperature, the above magnitudes vary in application of the following approximate relationships:

$$D = D_0(1 + \alpha c(T - T_0))$$

$$d = d_0(1 + \alpha h(T - T_0))$$

$$S = S_0(1 + \alpha b(T - T_0))^2$$

$$he = he_0(1 + \alpha b(T - T_0))$$

$$hf = hf_0(1 + \alpha f(T - T_0))$$

where:
T is the temperature of the sensor for which the calculation is being performed;
$T_0$ is a reference temperature; and
$D_0$, $d_0$, $S_0$, $he_0$, and $hf_0$ are the values of D, d, S, he, and hf respectively at the reference temperature.

If the body and the HT electrode are made of the same material, are subject to the same temperature, and if the sum (he+hf) is much less than D/2, which is generally the case, then the relationship giving the capacitance C1 as a function of temperature becomes:

$$C1(T) = C1(T_0 \cdot (1 + \alpha b(T - T_0))^2 / (1\alpha c(T - T_0))$$

If $(\alpha b(T - T_0))^2$ is much less than 1, which condition is nearly always true, then the relationship becomes:

$$C1(T) = C1(T_0) \cdot (1 + 2\alpha b(T - T_0))/(1 + \alpha c(T - T_0))$$

If the materials of the body and of the LT electrodes are such that $\alpha c = 2\alpha b$, then the relationship becomes:

$$C1(T) = C1(T_0)$$

which show that the capacitance C1 is no longer dependent on temperature.

In the intended applications, it is not essential to obtain drift that is accurately zero. A calculation performed without making approximations shows that providing the expansion coefficient $\alpha h$ of the high tension electrode material is equal to the expansion coefficient $\alpha c$ of the body, then there exists a window of values for $\alpha b$ and $\alpha h$ ($=\alpha c$) such that the temperature drift of the capacitor is reduced to a minimum.

For commonly usable materials, this window is such that it satisfies the following inequalities:

$$1.5 < \alpha b / \alpha c < 2.5$$

FIGS. 4 and 5 show a first method of fixing the LT electrodes to the body. To facilitate understanding the drawing, thicknesses are not drawn to scale.

For example, the body may possess four openings 8 disposed in a rectangle or a square, through which there pass four tabs 9 that are bonded to the LT electrode 3. In FIGS. 4 and 5, there can be seen the tabs 9A, 9B, and 9C that pass through openings 8A, 8B, and 8C respectively. The tabs have passing through them in pairs a spring of the piano wire type that is curved in circular manner with curvature equal to or slightly less than the curvature of the body 1.

Thus, the tabs 9A and 9B disposed on a right section of the cylinder 1 have the spring 10A passing through them, which spring is advantageously disposed in a groove 11 formed in the body 1. The spring 10A is bonded substantially at its midpoint 12A to the body 1. Insulating sleeves 13A and 13B serve to insulate the spring 10A electrically from the tabs, some of which are used as electrical connections.

In the same manner, the tabs 9C and 9D (tab 9D is not visible in FIGS. 4 and 5) have a spring 10B passing through them as shown in FIG. 5. There can also be seen an insulating sleeve 13C which insulates the spring 10B from the tab 9C.

The springs 10A and 10B exert a light force to maintain the LT electrode 3 pressed against the body via the insulation 4 while still allowing the electrode to expand freely.

Insulating studs such as 14A, 14B, and 14C serve to limit movement of the LT electrode 3.

Figure 6:
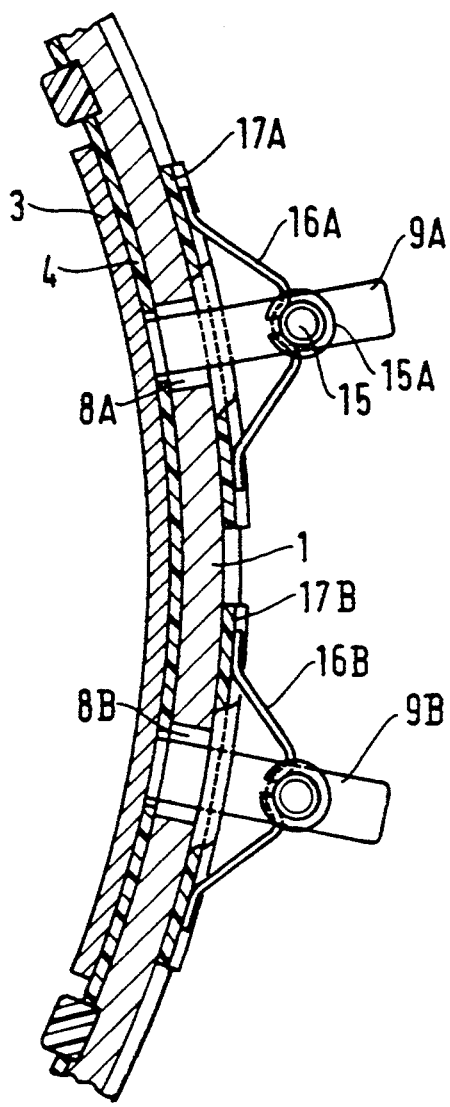
FIG. 6 is a fragmentary cross-section view of a portion of the capacitor, showing a second method of fixing the LT electrodes.
Figure 7:
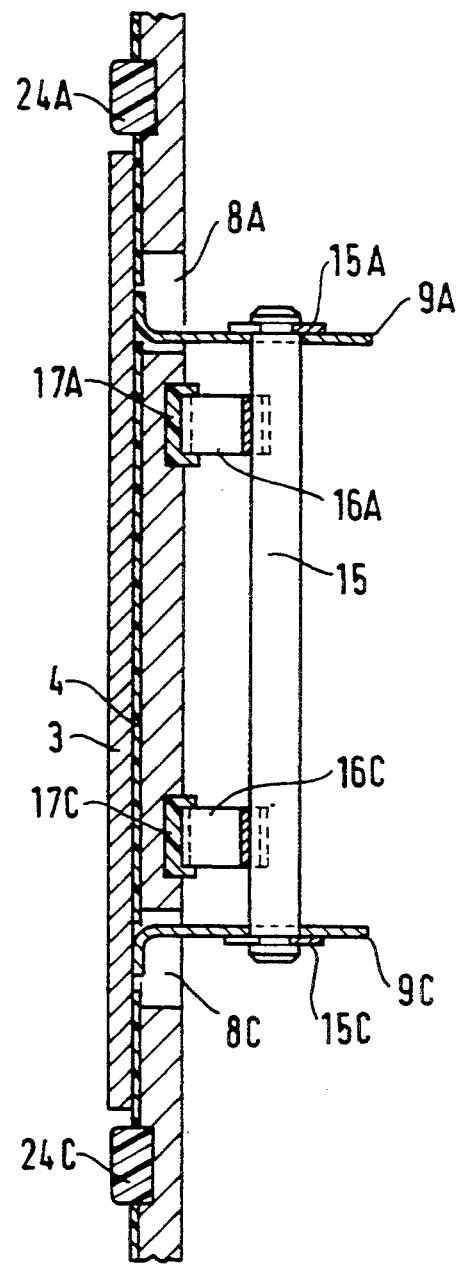
FIG. 7 is a fragmentary axial section view of a portion of the capacitor, showing the same method of fixing the LT electrodes as that shown in FIG. 6.

FIGS. 6 and 7 show a second method of implementing the electrode fixing means. Here again, the body is pierced by four openings 8A, 8B, 8C, etc. through which there pass metal tabs 9A, 9B, 9C; the tabs are connected together in pairs by rods; thus, the tabs 9A and 9C are interconnected by a rod 15 passing through the tabs and secured thereto by spring clips 15A and 15C; the tabs 9A and 9C are in alignment on a generator line of the cylinder 1; metal springs 16A and 16C bear firstly against the body 1 via insulating pads 17A, 17C disposed in outside grooves of the body 1, and secondly against the rod 15 so as to exert outwardly directed radial force thereon, thereby tending to pull out the tabs 9A and 9C. The LT electrode is thus held while still being left free to expand in its own plane. Insulating pads such as 24A and 24C received in inside grooves of the body 1 limit motion of the LT electrodes 3. In a variant that is not shown, the insulating pads 17A, 17B are omitted, with insulation being provided by the material of the rod which may be made of resin-impregnated fiberglass, for example; in that case the springs are directly in contact with the outside grooves of the body 1.

A third method of fixing the low tension electrodes is shown in FIGS. 8 and 9. The body 1, the low tension electrode 3 and its insulation 4 are all pierced by coinciding holes, e.g. such as the holes 8A, 8B, and 8C in the body, and 18A and 18C in the electrode 3 and in the insulating layer 4. These holes receive studs such as 20A, 20B, and 20C which are made of insulating material and each of which has a head and a shank. The studs are connected together in pairs by piano wire type springs 21, similar to the spring described with reference to FIGS. 3 and 4. The holes in the LT electrodes are of a diameter greater than that of the shanks so as to leave the LT electrodes free to expand.

This embodiment is very simple; the holes through the electrodes and the presence of the studs contribute to determining the capacitance of the capacitor, but it nevertheless remains constant at a function of temperature. There is no longer any need to install pads for limiting the movement of the LT electrodes.

Figure 11:
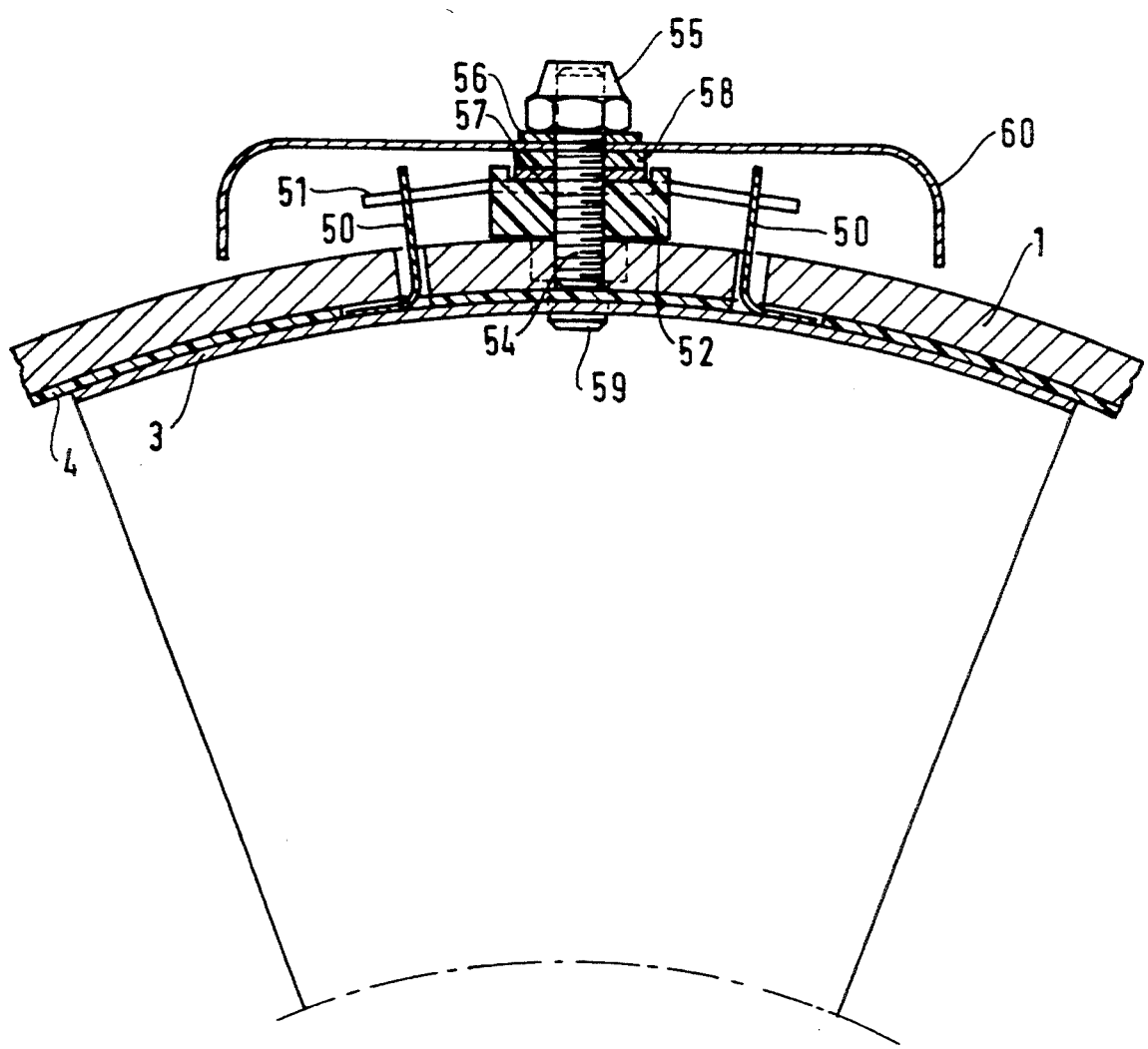
FIG. 11 is a fragmentary cross-section view through a portion of a capacitor, showing a fourth method of fixing the LT electrodes.
Figure 12:
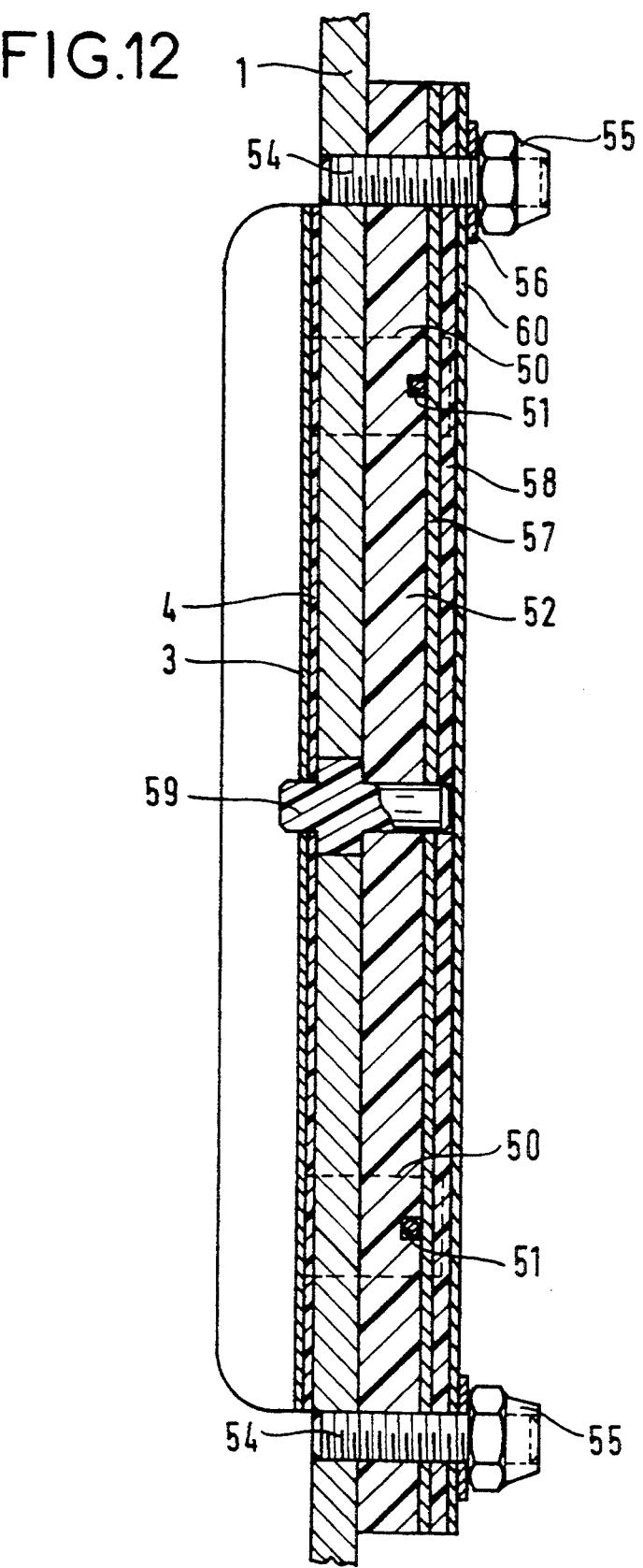
FIG. 12 is a fragmentary axial section view of a portion of the capacitor, showing the same method of fixing the LT electrodes as that shown in FIG. 11.

A fourth method of fixing the LT electrodes is shown in FIGS. 11 and 12. Elements that are common to these figures and to the preceding figures are given the same reference numerals.

The LT electrodes 3 have metal tabs 50 bonded thereto, which tabs are curved through a right angle and pass through the body via holes; the ends of the tabs are provided with respective holes; the tabs co-operate in pairs, receiving a piano wire 51 in their end holes, which piano wire bears against an insulating bar 52. The bar 52 is held on the body 1 by means of threaded shanks 54 that are screwed into the thickness of the body 1 and by means of clamping nuts 55 together with washers 56.

A current terminal constituted by a metal strip 57 serves to pick up current from the LT electrodes by passing through the tabs 50 and the piano wire 51. The current terminal is insulated by means of an insulting strip 58.

The LT electrodes are centered by means of insulating studs 59.

Finally, a metal cap 60 serves to smooth out equipotentials in the vicinity of this current terminal assembly.

The invention is particularly applicable to making a tension-measuring device in an electrical installation that is itself contained in a grounded metal enclosure.

Figure 10:
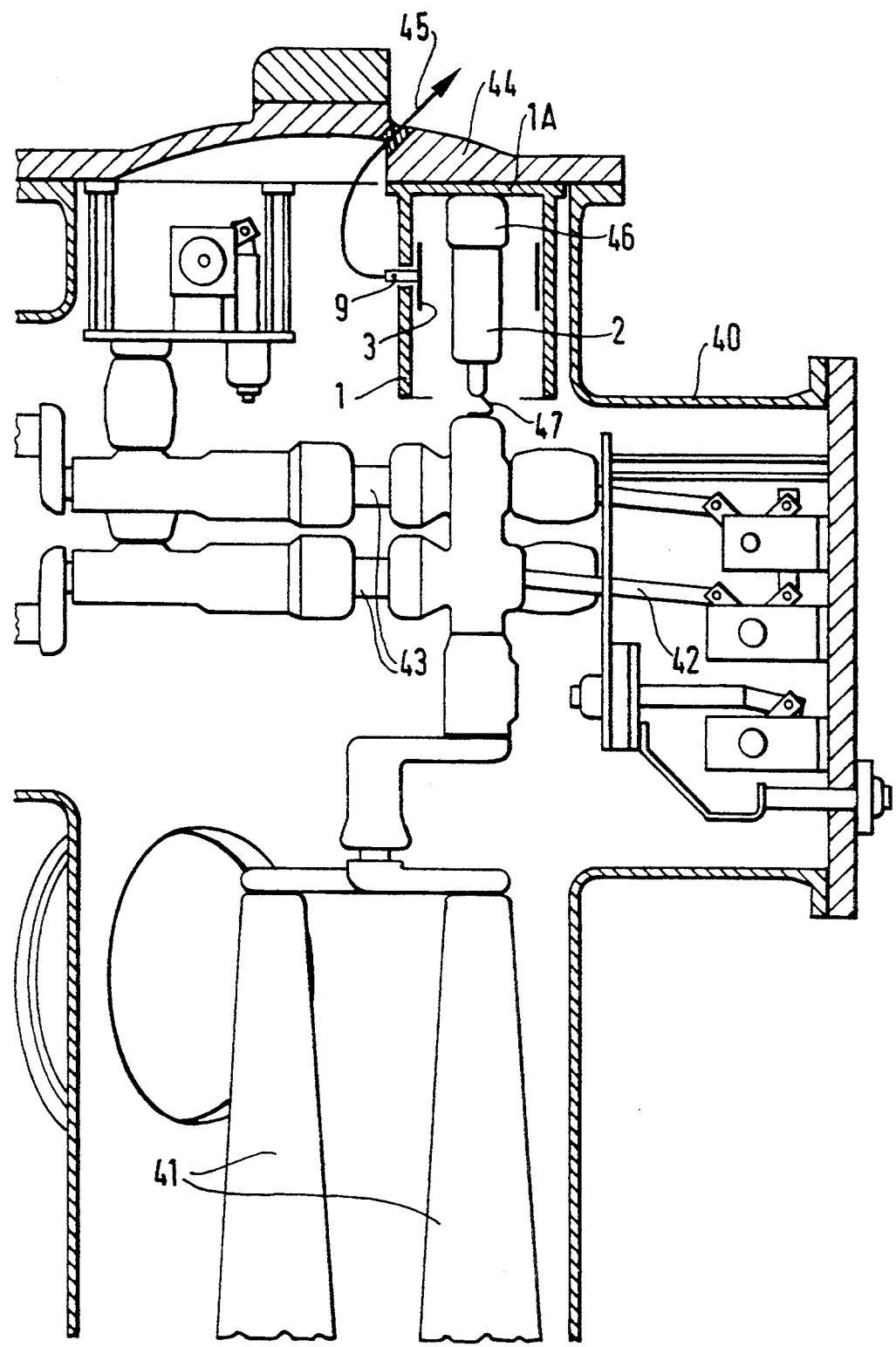
FIG. 10 is a fragmentary view of a metal-clad station in which a capacitor of the invention is placed.

FIG. 10 shows an application of the tension-measuring capacitor inside a metal-clad station. FIG. 10 shows one end of a metal-clad station that is insulated by means of $SF_6$ gas. There can be seen a grounded metal enclosure 40 that is filled with $SF_6$ under pressure, cable inlets 41, grounding section switches 42, and busbar section switches 43. The space available above the ends of the busbar section switches is used to receive capacitors C1 of the invention (one capacitor C1 per phase), with tension being measured at the end of each of the busbar section switches.

Only one of the three capacitors is shown in FIG. 10.

The body 1 of the capacitor is provided with a metal end 1A that is bonded to the metal cover 44 that closes the top portion of the enclosure. Connection tabs 9 are connected to electrical wires 49 that pass out through the enclosure via a sealed feedthrough.

The high tension electrode is secured to the end 1A via an insulator 46 and is connected to the conductor whose tension is to be measured by means of a connector 47.

Although the main application of the invention lies in making tension-measuring devices with a capacitive stepdown bridge, the invention is capable of application whenever it is essential to have a capacitor whose capacitance is highly stable with respect to temperature.

We claim:

1. A capacitor having high stability with temperature, comprising:
    a cylindrical metal body having inside and outside wall surfaces and a geometrical axis;
    a cylindrical high tension electrode coaxial with the body and placed inside said body;
    at least two low tension electrodes constrained to remain in contact against said inside wall surface of the body via an intervening insulated layer,
    said low tension electrodes being disposed symmetrically about said geometrical axis of the body,
    said low tension electrodes being held in place by retaining means that allow them to expand freely; and
    a dielectric medium which extends between the high tension electrode and the low tension electrodes, and which is a gas or a vacuum,
    the body being made of a material having an expansion coefficient $\alpha c$ equal to art expansion coefficient $\alpha h$ of a material of the high tension electrode, and the expansion coefficient $\alpha c$ of the body material being related to art expansion coefficient $\alpha b$ of a material of the low tension electrodes by the following inequalities:

$$1.5 < \alpha b/\alpha c < 2.5$$

2. A capacitor according to claim 1, wherein the body material is selected from aluminum alloys.

3. A capacitor according to claim 1, wherein the material of the low tension electrodes is selected from stainless steels.

4. A capacitor according to claim 1, comprising four pairs of low tension electrodes.

5. A capacitor according to claim 1, wherein each low tension electrode is fixed to at least one metal tab passing through a hole of the body, whereby there are a plurality of metal tabs, at least one of said tabs being used for electrical connection purposes.

6. A capacitor according to claim 5, wherein said means comprise at least one spring of the piano wire type, which is secured at a center region thereof to the outside wall surface of the body, and which passes through two of said tabs disposed on the same right cross-section of the body.

7. A capacitor according to claim 6, wherein said spring is disposed in a groove formed in the outside wall surface of the body.

8. A capacitor according to claim 7, wherein said two tabs and said spring are electrically insulated from one another by means of insulating sleeves.

9. A capacitor according to claim 5, wherein said means comprise at least one rod passing through two of said tabs disposed on a common generator line of the body, and a plurality of springs bearing firstly against the body and secondly against the rod so as to apply an outwardly-directed radial force on the tabs.

10. A capacitor according to claim 1, wherein the retaining means for holding the low tension electrodes comprise metal tabs passing through the body and cooperating in pairs with respective piano wires bearing on an insulating bar fixed to the outside wall surface of the body.

11. A capacitor according to claim 1, wherein the body carries pads on its inside wall surface to limit movement of the low tension electrodes.

12. A capacitor according to claim 1, wherein the retaining means comprise at least one pair of insulating studs each possessing a shank and a head and extending along a right cross-section of the cylinder constituting the body, said shanks passing through the low tension electrodes and the body via holes formed therein, the heads being placed on the inside wall surface of the body, and the two pads in said pair having a corresponding piano wire type spring passing through them.

13. A metal-clad station comprising a gastight metal enclosure filled with dielectric gas under pressure inside which there are disposed apparatuses including section switches, circuit breakers, and sets of busbars, said station being provided with a capacitive stepdown bridge comprising two capacitors associated with an amplifier for the purpose of measuring tension of one of said apparatuses, wherein one of said capacitors comprises:
    a cylindrical metal body having inside and outside wall surfaces and a geometrical axis;
    a cylindrical high tension electrode coaxial with the body and placed inside said body;
    at least two low tension electrodes constrained to remain in contact against said inside wall surface of the body via an intervening insulated layer,
    said low tension electrodes being disposed symmetrically about said geometrical axis of the body,
    said low tension electrodes being held in place by retaining means that allow them to expand freely; and
    a dielectric medium which extends between the high tension electrode and the low tension electrodes, and which is a gas or a vacuum,
    the body being made of a material having an expansion coefficient $\alpha c$ equal to an expansion coefficient $\alpha h$ of a material of the high tension electrode, and the expansion coefficient $\alpha c$ of the body material being related to an expansion coefficient $\alpha b$ of a material of the low tension electrodes by the following inequalities:

$$1.5 < \alpha b/\alpha c < 2.5$$

14. The metal-clad station according to claim 13, wherein the body of the capacitor possesses a metal end bonded to art inside of the enclosure on a wall thereof, the high tension electrode being fixed to said end via an insulator and being connected to the electrical apparatus whose tension is to be measured via a connector.

* * * * *